United States Patent [19]

Bernier

[11] Patent Number: 5,351,511
[45] Date of Patent: Oct. 4, 1994

[54] TRAILER KINGPIN LOCKING DEVICE

[75] Inventor: Jean P. Bernier, Arlington, Va.

[73] Assignee: Palma Auto Boot/Palma, Inc., Arlington, Va.

[21] Appl. No.: 35,390

[22] Filed: Mar. 23, 1993

[51] Int. Cl.5 .............................................. F16B 41/00
[52] U.S. Cl. .......................................... 70/232; 70/14; 70/163; 280/507
[58] Field of Search .................. 70/165, 230, 231, 232, 70/14, 58, 258, 163, 166, 158; 280/507

[56] References Cited

U.S. PATENT DOCUMENTS

| | | |
|---|---|---|
| 2,554,306 | 5/1951 | Mack . |
| 2,630,698 | 3/1953 | Morrow . |
| 2,960,857 | 11/1960 | Winter . |
| 3,004,421 | 10/1961 | Bowler . |
| 3,415,085 | 12/1968 | Eble, Jr. .............................. 70/232 |
| 3,526,110 | 9/1970 | Foote ................................. 280/507 |
| 3,600,914 | 8/1971 | Johnson et al. . |
| 3,780,546 | 12/1973 | Longnecker ....................... 280/507 |
| 3,789,635 | 2/1974 | Van Brunt et al. ................. 70/232 |
| 3,922,897 | 12/1975 | Mickelson . |
| 3,977,221 | 8/1976 | Foote ................................. 270/507 |
| 4,031,727 | 6/1977 | De Groat et al. ................. 70/232 |
| 4,553,415 | 11/1985 | Maffey . |
| 4,620,718 | 11/1986 | Mickelson . |
| 4,951,487 | 8/1990 | Sheils Dennis .................... 70/233 |
| 5,181,405 | 1/1993 | Wheeler ............................. 70/232 |

FOREIGN PATENT DOCUMENTS

| | | | |
|---|---|---|---|
| 861800 | 1/1971 | Canada ............................. | 70/58 |
| 1532282 | 11/1978 | United Kingdom ............... | 70/232 |

OTHER PUBLICATIONS

Auto-Boot Immobilizer, pamphlet.

*Primary Examiner*—Peter M. Cuomo
*Assistant Examiner*—Darnell M. Boucher
*Attorney, Agent, or Firm*—Cushman, Darby & Cushman

[57] ABSTRACT

A locking device for selectively lockingly engaging a towing element of a trailer to block coupling access to the towing element. The locking device includes a housing defining a towing element receptacle, an engaging element having an engaging portion and an actuating portion for selectively engaging a towing element disposed within the towing element receptacle, a locking compartment adapted to house the actuating portion of the engaging element, a locking compartment cover, an actuating tool coupled to the locking compartment cover and adapted to cooperate with the actuating portion of the engaging element, a locking chamber for receiving the actuating tool when the locking compartment cover is in a closed position, and a lock for selectively locking the actuating tool within the locking chamber and locking the cover in place.

17 Claims, 2 Drawing Sheets

TRAILER KINGPIN LOCKING DEVICE

BACKGROUND OF THE INVENTION

1. Field of the Invention

The present invention relates to a locking device, and, in particular, to a locking device which is adapted to be lockably secured to a towing pin or coupling element of a trailer so that unauthorized access to the coupling element and hence towing of the trailer is effectively prevented.

2. Description of the Related Art

Conventional trailer assemblies have a towing element or kingpin coupling element which protrudes in a downward direction from the bottom of the trailer bed. Tractors are designed to be coupled to and tow a trailer by rotatably encasing the kingpin. Coupling is achieved by inserting the kingpin of the trailer into a generally circular coupling device on the tractor. The circular coupling device is commonly referred to as a "fifth wheel". The trailer kingpin fits into a hole or slot in the center of the fifth wheel and is rotatably locked therein, thus enabling the trailer to be towed by the tractor.

There are many instances in which it is desirable to prevent a trailer from being towed by a tractor. For example, because trailer can be stolen or hijacked by simply attaching the trailer to a tractor and hauling away the trailer, trailer owners have a need for a device suited to prevent towing access to the trailer kingpin. Furthermore, law enforcement agents must periodically immobilize or "boot" trailers when there has been a legal infraction, such as a parking violation.

To prevent the unauthorized towing of a trailer it is known to attach a locking device to the kingpin of the trailer to prevent the fifth wheel from engaging it.

A typical prior art locking device includes a casing enclosing the kingpin of the trailer, a slidable locking bar within the casing for engaging the kingpin thereby securing the casing to the kingpin, and a lock mechanism for locking the locking bar in its engaged position. Known locking devices of this type are generally mechanically complicated and include a number of parts formed within the locking device. The complexity of such locking mechanisms makes them expensive, susceptible to a greater probability of mechanical failure, and difficult to use. Also one or more component parts may be misplaced rendering the unit unusable.

In another type of prior art device, shown in U.S. Pat. No. 3,600,914, a threaded studbolt rather than a locking bar engages the kingpin of the trailer. However, a separate tool for turning the studbolt is required to engage and disengage this device from the kingpin of a trailer, and the separate tool can be easily lost or misplaced. Also, in that device, access to the head of the studbolt is selectively blocked by a locking plug assembly which fits into a hole similar in size to that occupied by the studbolt. This further complicates the assembly and increases cost. Thus, that locking plug assembly suffers many of the same problems associated with the other, complicated locking mechanisms described above.

SUMMARY OF THE INVENTION

It is an object of the present invention to provide a locking device for lockingly engaging a coupling or towing element, such as a kingpin of a trailer, which overcomes the problems associated with the prior art as discussed above.

In accordance with the principles of the present invention, this objective is achieved by providing a locking device having a housing defining a towing element receptacle for receiving the towing element of a trailer therein such that when the towing element is received within the receptacle, towing engagement with a tractor coupling device is precluded. The locking device is releasably secured to the towing element with an engaging element. The engaging element is coupled to the receptacle such that it is selectively displaceable into engagement with the towing element. The engaging element has an engaging portion for engaging the towing element within the receptacle and an actuating portion for selectively bringing the engaging portion into an engaging relationship with the towing element. To prevent access to the actuating portion, the housing further defines a locking compartment for enclosing the actuating portion. The locking compartment is selectively closed by a locking compartment cover. When the locking compartment is closed, coupling access to the actuating portion blocked. The actuating portion is preferrably actuated by an actuating tool affixed to the cover. In that event, the housing also defines a locking chamber adjacent to the locking compartment for receiving the actuating tool when the cover closes the locking compartment. The cover may be locked in place by engaging a pad lock or the like with a pair of alligned holes in the locking chamber and a bore in the actuating tool which is alligned with the pair locking chamber holes. In this manner, access to the actuating portion is effectively blocked, and, therefore, the locking device cannot easily be removed from the towing element of the trailer, thereby effectively preventing the trailer from being towed.

It is a further object of the present invention to provide a locking device which is simple in construction, economical in manufacture and effective in operation.

These and other objects of the present invention will become more apparent during the course of the following detailed description of a preferred embodiment of the invention and the appended claims.

DETAILED DESCRIPTION OF THE PRESENTLY PREFERRED EXEMPLARY EMBODIMENT

Figure 1:
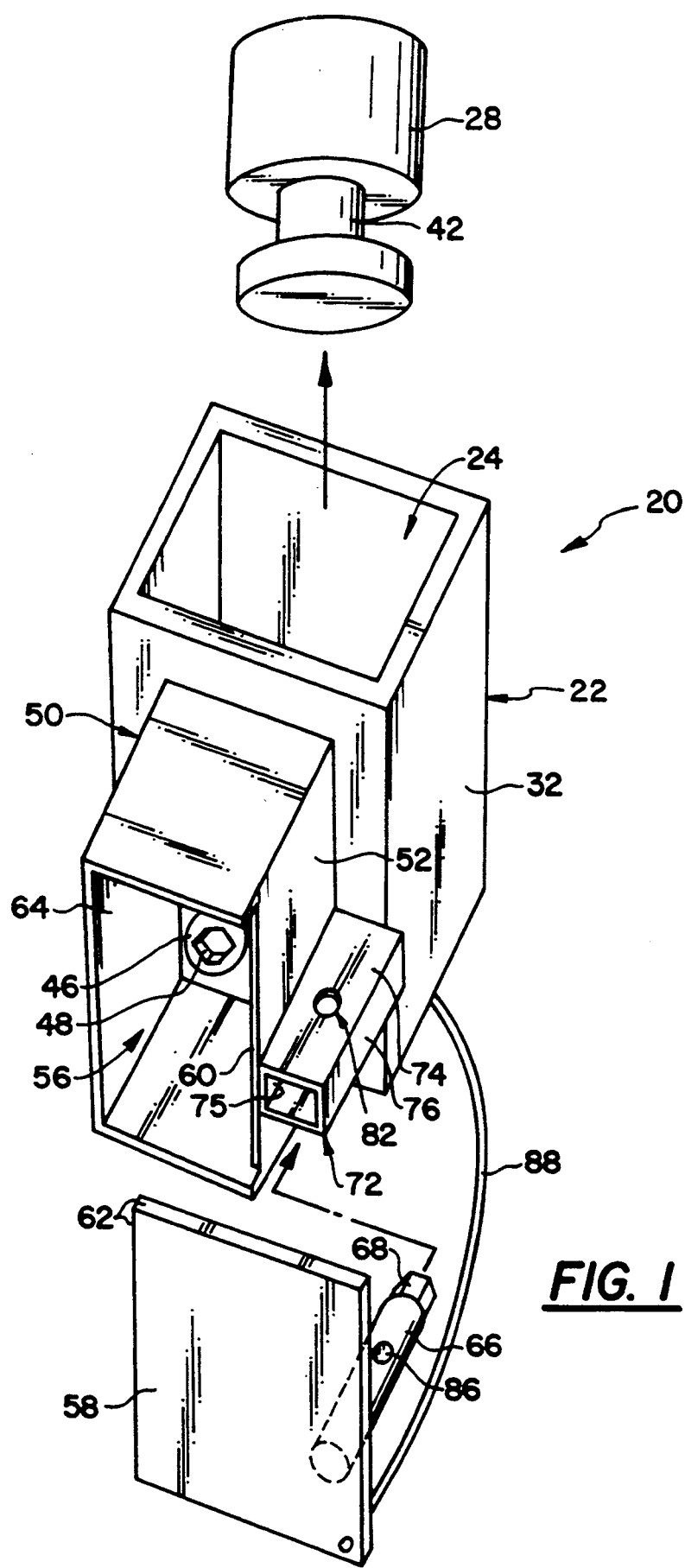
FIG. 1 is a perspective view of a locking device according to the principles of the present invention showing the cover plate in an open position.
Figure 2:
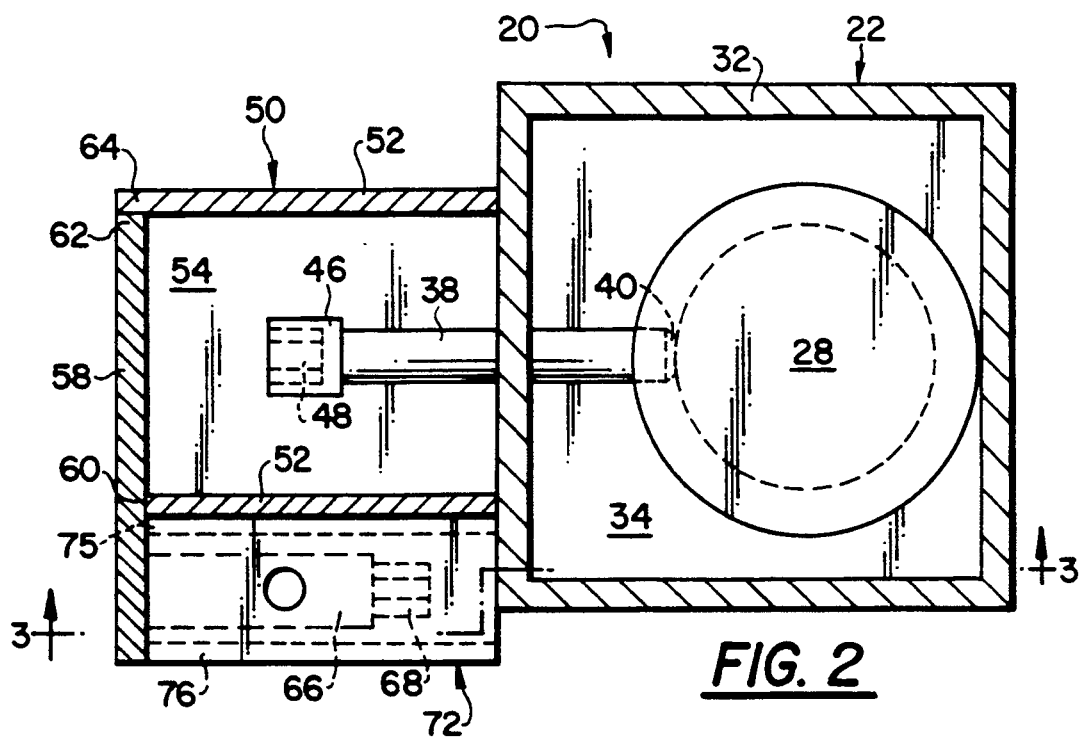
FIG. 2 is a top sectional view of the locking device according to the principles of the present invention showing the locking device engaged on the towing element of a trailer with the cover plate in a closed position.
Figure 3:
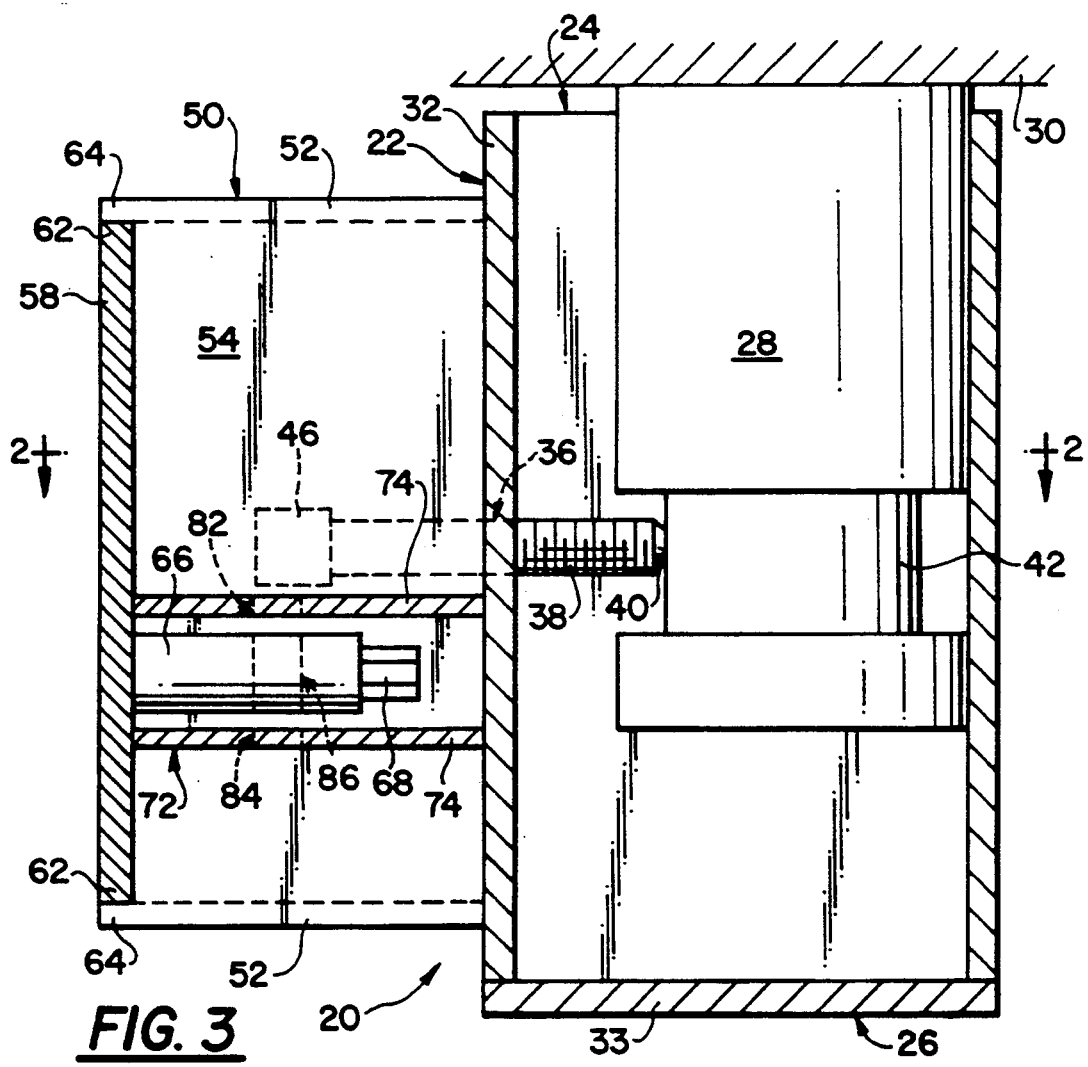
FIG. 3 is an side sectional view of the locking device shown in FIG. 2.

Referring now more particularly to FIGS. 1, 2 and 3 of the drawings, there is shown therein a locking device according to the principles of the present invention and generally indicated at 20. The locking device 20 comprises a towing element receptacle 22 having an open end 24 and a closed end 26. A towing element 28 or kingpin of a trailer 30 fits into the towing element receptacle 22 such that coupling access to the towing element 28 is blocked when the towing element 28 is enclosed in the towing element receptacle 22. As shown, the towing element receptacle 22 is generally tubular and is formed by four receptacle walls 32 integral with one another at right angles defining a towing element receptacle opening 34 therebetween. A bottom receptacle wall 33 attached to the four receptacle walls 32 defined the closed end 26 of the towing element receptacle 22. It is to be understood that the shape and size of the towing element receptacle 22 is not critical and can be of any desired configuration sufficient to define a towing element receptacle opening 34 therein.

One of the four receptacle walls 32 in the towing element receptacle 22 includes a threaded aperture 36 through which a locking bolt 38 is threaded. The threads on the locking bolt 38 cooperate with the threaded aperture such that rotating the locking bolt 38 causes the locking bolt 38 to move in a direction generally perpendicular to the receptacle wall 32 having the threaded aperture 36. In this manner the locking bolt 38 can be selectively displaced relative to the towing element 28 from a disengaged position to and engaged position. The locking bolt 38 has an engaging portion 40 that releasably engages a channel 42 in the towing element 28 when the towing element 28 is enclosed in the towing element receptacle 22. The locking bolt 38 also has an actuating portion 46 integral with the locking bolt 38 at an second end portion opposite the engaging portion 40 of the locking bolt 38. The actuating portion 46 enables the locking bolt 38 to be rotated for selectably attaching and detaching the locking device 20 from the towing element 28 of the trailer 30. It is to be understood that the locking bolt 38 and towing element receptacle 22 may be configured in any manner which provides a means for securing the towing element 28 within the towing element receptacle 22.

The locking device 20 also includes a locking compartment, generally indicated at 50, in which the actuating portion 46 of the locking bolt 38 is housed. As shown, the locking compartment 50 is formed by four locking compartment walls 52 connected to the receptacle wall 32 of the towing element receptacle 22 having the threaded aperture 36. The four locking compartment walls 52 are located such that they surround the actuating portion 46 of the locking bolt 38 and define a locking compartment opening 54 therebetween. As shown, the four locking compartment walls 52 extend in a generally perpendicular direction away from the towing element receptacle 22 and are integral with each other at generally right angles.

The locking compartment 50 has an open end 56 for accessing the actuating portion 46 of the locking bolt 38 housed therein. To block access to the actuating portion 46, a cover plate 58 is provided. FIGS. 2 and 3 show the locking device 20 of the present invention with the cover plate 58 in a closed position such that the cover plate 58 blocks access to the actuating portion 46. FIG. 1 shows the cover plate 58 in an open position thereby providing access to the actuating portion 46 of the locking bolt 38. In an exemplary embodiment of the present invention and as shown in FIGS. 1 and 2, the cover plate 58, when in a closed position, rests upon an end surface 60 of one of the four locking compartment walls 52, and extends over the open end 56 of the locking compartment 50 so as to block access to the actuating portion 46 of the locking bolt 38 housed therein. The cover plate 58 has edge portions 62, which are positioned adjacent to end portions 64 of the locking compartment walls 52 when the cover plate 58 is in a closed position.

The cover plate 58 has attached thereto an actuating tool 66 having a first end portion 68. The first end portion 68 is adapted to cooperate with the actuating portion 46 of the locking bolt 38. In an exemplary embodiment, the first end portion 68 is hexagonally shaped so as to fit into an allen head arrangement 48 in the actuating portion 46 of the locking bolt 38. Rotating the actuating tool 66 and the associated cover plate 58, when the first end portion 68 is cooperating with the actuating portion 46, rotates the locking bolt 38 thereby selectively engaging and disengaging the engaging portion 40 of the locking bolt 39 with the towing element 28. For example, rotating the actuating tool 66 and cover plate 58 in a first direction causes locking bolt 38 to move toward the towing element 28 within the towing element receptacle 22 thereby engaging the engaging portion 40 of the locking bolt 38 with the towing element 28. Rotating the actuating tool 66 and cover plate 58 in a second direction opposite the first direction causes the locking bolt 38 to move away from the towing element 28 thereby disengaging the engaging portion 40 from the towing element 28.

The locking device 20 includes a locking chamber, generally indicated at 72, for receiving the actuating tool 66 therein when the cover plate 58 is in a closed position. In an exemplary embodiment and as shown in the FIGURES, the locking chamber 72 is formed by a pair of locking chamber walls 74 integral with one of the locking compartment walls 52. An opposed locking chamber wall 76 extends between the pair of locking chamber walls 74 defining a locking chamber opening 78 therebetween. The locking chamber 72 has an open end 80 through which the actuating tool 66 extends when the cover plate 58 is closed. As shown, the pair of locking chamber walls 74 extend in a generally perpendicular direction from one of the locking compartment walls 52 and are integral with the opposed locking chamber wall 76 at generally right angles. A second opposed locking chamber wall 75 may be provided which extends between the pair of locking chamber walls 74 at and end thereof opposite that of the opposed locking chamber wall 76.

The pair of locking chamber walls 74 each have a hole 82 and 84 therethrough and aligned with one another. The actuating tool 66 also includes a hole 86 therethrough. The actuating tool hole 86 is situated such that it aligns with the locking chamber wall holes 82 and 84 when the cover plate 58 is in a closed position and the actuating tool 66 is enclosed in the locking chamber 72. The holes 82, 84, and 86 enable the actuating tool 66 to be locked into the locking member by means of a locking mechanism (not shown), such as a padlock, inserted through the holes 82, 84 and 86.

In a preferred embodiment, the cover plate 58 is secured to the towing element receptacle 22 via an attaching means 88 such as a wire chain of metal or plastic.

The operation of the locking device 20 to releasably lock the locking device 20 onto a towing element 28 of a trailer 30 for preventing towing access thereto is described below. The locking device 20 is first manually positioned over the towing element 28 of a trailer 30 such that the towing element 28 is enclosed in the locking element receptacle 22. The locking device 20 is then secured to towing element 28 by the locking bolt 38 as the result of a towing portion engaging procedure. The initial step in the towing portion engaging procedure requires the operator to engage the first end portion 68 of the actuating tool 66 with the actuating portion 46 of the locking bolt. In an exemplary embodiment, the actuating portion 46 is a bolt head with a female hexagonal receptacle and the first end portion 68 includes a hexagonal head portion adapted to cooperate with the female hexagonal receptacle. Next, the actuating tool 66 and the associated cover plate 58 are manually rotated in a first direction thereby causing the locking bolt 38 to rotate within the threaded aperture 36 so that the locking bolt 38 moves toward the towing element 28. Rotating the actuating tool 66 causes the engaging portion 40 of the locking bolt 38 to engage the channel 42 of the towing element 28. Continued rotation of the actuating tool 66 forces the towing element 28 against a receptacle wall 32 of the towing element receptacle 22 opposite to the receptacle wall having the threaded aperture 36 therein, and as a result, the towing element 28 is held firmly within the towing element receptacle 22 between a receptacle wall 32 of the towing element receptacle 22 and the engaging portion 40 of the locking bolt 38. As a final step in the towing element engaging procedure, the first end portion 68 of the actuating tool 66 is disassociated from the actuating portion 46 of the locking bolt 38.

After the towing element 28 is secured within the towing element receptacle 22, access to the actuating portion 46 is blocked by placing the cover plate 58 over the open end 56 of the locking compartment 50, thereby closing the locking compartment 50. The locking chamber 72 is situated with respect to the locking compartment 70 such that closing the locking compartment 50 with the cover plate 58 also encloses the actuating tool 66 within the locking chamber 72. The actuating tool 66 is locked within the locking chamber 72 by placing a locking mechanism (not shown) through the holes 82, 84 and 86 and locking the locking mechanism thereto. In a preferred embodiment a padlock (not shown) is placed through the holes 82, 84 and 86 thereby securing the actuating tool 66 within the locking compartment. Because the actuating tool 66 is secured to the cover plate 58, when the actuating tool 66 is locked with the locking chamber 72 the cover plate 58 is also locked in the closed position over the open end 56 of the locking compartment 50. As a result, access to the actuating portion 46 is blocked and the locking device 20 thus cannot be easily removed from the towing element 28.

It is to be understood that while the preferred embodiment of the present invention has been described above, it is contemplated that the locking device 20 of the present invention may be formed of a single housing member defining chambers, openings or the like therein corresponding to the various elements of the present invention, such as the towing element receptacle opening 34, the locking compartment opening 54, and the locking chamber opening 78. Furthermore, different configurations for the various members forming the locking device 20, such as the towing element receptacle 22, the locking compartment 50, the cover plate 58, and the actuating tool 66, are contemplated by the present invention.

It will then be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed:

1. A locking device for selectively lockingly engaging a towing element of a trailer to block access to said towing element, said locking device comprising:
    a housing means defining a towing element receptacle for receiving and housing a towing element;
    an engaging element for selectively engaging the towing element to retain it within said housing means, said engaging element being coupled to said housing means so as to be displaceable relative thereto from a disengaged position to an engaged position, said engaging element having an engaging portion which engages the towing element when said engaging element is in said engaged position and an actuating portion remote from said engaging portion, engagement and displacement of said actuating portion displacing said engaging portion of said engaging element into engagement with said towing element to secure and lock said towing element within said housing means;
    removable lockable covering means for selectively blocking access to said actuating portion of said engaging element, said covering means providing access to said actuating portion of said engaging element when removed to thereby enable said engaging element to be moved between said engaged position and said disengaged position;
    an actuating tool means coupled to said covering means for displacing said engaging element and
    locking means for lockably securing said covering means such that said lockable covering means when not removed blocks access to said actuating portion of said engaging element.

2. The locking device of claim 1, wherein said housing means further defines a locking compartment for housing said actuating portion of said engaging means.

3. The locking device of claim 1, further comprising an attachment element for securing said covering means to said housing means.

4. The locking device of claim 1, wherein said actuating tool means interdigitally cooperates with said actuating portion of said engaging element for selectively displacing said engaging element to selectively engage said engaging element with the towing element.

5. The locking device of claim 4, wherein said housing means further defines a locking chamber for receiving said actuating tool means.

6. The locking device of claim 4, wherein said actuating tool means is attached to said lockable covering means.

7. The locking device of claim 6, wherein said locking means for lockably securing said covering means comprises:
    means for locking said actuation tool means in a fixed relation with respect to said housing thereby locking said covering means in said closed position.

8. The locking device of claim 1, wherein said housing means defining said towing element receptacle comprises a tubular portion formed by at least one receptacle wall, said tubular portion having an open end and a closed end, said receptacle wall having a threaded aperture therethrough, and
    said engaging element comprises an at least partially threaded locking bolt threadable through said threaded aperture.

9. The locking device of claim 8, wherein said housing means further defines a rectangular locking compartment for housing said actuating portion of said engaging element, said locking compartment being formed by at least one locking compartment wall coupled to and extending from said tubular member proximate to said threaded aperture and having an open end portion providing access to said actuating portion housed therein.

10. The locking device of claim 9, wherein said lockable covering means comprises a substantially planar cover for blocking access to said actuation portion by covering said open end portion of said locking compartment.

11. The locking device of claim 10, further comprising an actuating tool coupled to said substantially planar cover, wherein said actuating tool includes an end portion adapted to cooperate with said actuating portion of said engaging element such that rotation of said actuating tool in a first direction displaces said engaging element toward the towing element and rotation of said actuating tool in a second direction displaces said engaging element away from the towing element.

12. A locking device for selectively lockingly engaging a towing element of a trailer to block access to said towing element, said locking device comprising:

a housing means defining a towing element receptacle for receiving and housing a towing element, said housing means comprising a tubular portion formed by at least one receptacle wall, said tubular portion having an open end and a closed end, said receptacle wall having a threaded aperture therethrough, an engaging element for selectively engaging the towing element to retain it within said housing means, said engaging element comprising an at least partially threaded locking bolt threadable through said threaded aperture and being coupled to said housing means so as to be displaceable relative thereto from a disengaged position to an engaged position, said engaging element having an engaging portion which engages the towing element when said engaging element is in said engaged position and an actuating portion remote from said engaging portion, engagement and displacement of said actuating portion displacing said engaging portion of said engaging element into engagement with said towing element to secure and lock said towing element within said housing means, said housing means further defining a locking compartment for housing said actuating portion of said engaging element, said locking compartment being formed by at least one locking compartment wall coupled to and extending from said tubular member proximate to said threaded aperture and having an open end portion providing access to said actuating portion housed therein;

a substantially planar cover for blocking access to said actuating portion of said engaging element by covering said open end portion of said locking compartment; and an actuating tool coupled to said cover, said actuating tool having an end portion adapted to cooperate with said actuating portion of said engaging element such that rotation of said actuating tool in a first direction displaces said engaging element toward the towing element and rotation of said actuating tool in a second direction displaces said engaging element away from the towing element, wherein said housing means further includes walls defining a locking chamber adjacent to said locking compartment for receiving said actuating tool therein when said cover is in a closed position.

13. The locking device of claim 12, wherein said locking chamber comprises at least one locking chamber wall projecting from said locking compartment.

14. The locking device of claim 12, further comprising an actuating tool locking means for locking said actuating tool within said locking chamber.

15. The locking device of claim 14, wherein said actuating tool locking means comprises a bore through said actuating tool and a pair of holes through said wall, said pair of holes being disposed on opposite sides of said actuating tool and aligning with said bore when said actuating tool is received within said locking compartment, whereby a locking mechanism can be inserted through, for locking said actuating tool within said locking chamber.

16. The locking device of claim 15, further comprising an attaching means for connecting said covering means to said housing.

17. The locking device of claim 8, wherein said tubular portion has generally square cross-section.

* * * * *